US010063306B2

United States Patent
Kim et al.

(10) Patent No.: US 10,063,306 B2
(45) Date of Patent: Aug. 28, 2018

(54) METHOD AND SYSTEMS USING QUASI-SYNCHRONOUS DISTRIBUTED CDD SYSTEMS

(71) Applicant: Mitsubishi Electric Research Laboratories, Inc., Cambridge, MA (US)

(72) Inventors: Kyeong Jin Kim, Lexington, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/332,008

(22) Filed: Oct. 24, 2016

(65) Prior Publication Data

US 2018/0115359 A1    Apr. 26, 2018

(51) Int. Cl.
| | |
|---|---|
| H04L 27/00 | (2006.01) |
| H04B 7/06 | (2006.01) |
| H04W 4/00 | (2018.01) |
| G01S 19/13 | (2010.01) |
| H04W 4/70 | (2018.01) |
| H04L 27/26 | (2006.01) |

(52) U.S. Cl.
CPC ............ *H04B 7/0671* (2013.01); *G01S 19/13* (2013.01); *H04W 4/005* (2013.01); *H04W 4/70* (2018.02); *H04L 27/2601* (2013.01)

(58) Field of Classification Search
None
See application file for complete search history.

(56) References Cited

U.S. PATENT DOCUMENTS 5,991,308 A * 11/1999 Fuhrmann ............ H03M 13/256
370/395.53
6,307,868 B1 * 10/2001 Rakib ................. H03M 13/256
348/E7.07

(Continued)

OTHER PUBLICATIONS

S. Simeone, O. Somekh, E. Erkip, H. V. Poor, and S. Shamai, "Robust communication via decentralized processing with unreliable backhaul links," IEEE Trans. Inf. Theory, vol. 57, pp. 4187-4201, Jul. 2011.

(Continued)

*Primary Examiner* — Berhanu Tadese
(74) *Attorney, Agent, or Firm* — Gene Vinokur; James McAleenan; Hironori Tsukamoto

(57) ABSTRACT

Systems and methods for a communication system including a set of transmitters, wherein operations of the set of transmitters are synchronized with an accuracy bound by a synchronization error. A controller communicatively connected to each transmitter in the set of transmitters, wherein the controller is configured to: determine a tap delay for a communication channel between a receiver and each transmitter in the set of transmitters to produce a set of tap delays. Determine a minimal length of a cyclic prefix as a function of a sum of the synchronization error and a maximal tap delay in the set of tap delays. Finally, controls at least some transmitters in the set of transmitters to transmit a message to the receiver using a cyclic delay diversity (CDD) with the cyclic prefix having at least the minimal length.

18 Claims, 15 Drawing Sheets

(56) References Cited

U.S. PATENT DOCUMENTS

| | | | | |
|---|---|---|---|---|
| 6,356,555 B1* | 3/2002 | Rakib | H03M 13/256 | 370/441 |
| 6,665,308 B1* | 12/2003 | Rakib | H03M 13/256 | 348/E7.07 |
| 6,842,487 B1* | 1/2005 | Larsson | H04B 7/0671 | 375/260 |
| 7,673,219 B2* | 3/2010 | Molisch | H04B 7/026 | 714/772 |
| 8,526,512 B2* | 9/2013 | Higashinaka | H04J 11/0033 | 370/294 |
| 9,497,641 B2* | 11/2016 | Garin | H04B 7/0671 | |
| 2003/0007471 A1* | 1/2003 | Terasawa | H04B 7/2668 | 370/335 |
| 2005/0281240 A1* | 12/2005 | Oh | H04B 7/0671 | 370/343 |
| 2006/0193245 A1* | 8/2006 | Aghvami | H04B 7/0671 | 370/208 |
| 2007/0171853 A1* | 7/2007 | Jones | H04B 7/269 | 370/328 |
| 2008/0039107 A1* | 2/2008 | Ma | H04B 7/02 | 455/450 |
| 2008/0132282 A1* | 6/2008 | Liu | H04B 7/0671 | 455/562.1 |
| 2008/0144512 A1* | 6/2008 | Molisch | H04B 7/026 | 370/238 |
| 2008/0279172 A1* | 11/2008 | Suemitsu | H04L 27/0014 | 370/347 |
| 2009/0080543 A1* | 3/2009 | Azizi | H04B 7/0671 | 375/260 |
| 2010/0014413 A1* | 1/2010 | Castelain | H04L 1/0606 | 370/208 |
| 2010/0040164 A1* | 2/2010 | Castelain | H04B 7/0667 | 375/267 |
| 2010/0074210 A1* | 3/2010 | Gaal | H04B 7/0671 | 370/329 |
| 2010/0080114 A1* | 4/2010 | Ratnam | H04L 5/0007 | 370/210 |
| 2010/0309999 A1* | 12/2010 | Yang | H04B 7/0671 | 375/260 |
| 2011/0074632 A1* | 3/2011 | Yeo | G01S 5/0273 | 342/387 |
| 2011/0116566 A1* | 5/2011 | Takahashi | H04B 7/0671 | 375/260 |
| 2012/0189074 A1* | 7/2012 | Jin | H04B 7/024 | 375/267 |
| 2014/0160939 A1 | 6/2014 | Arad et al. | | |

OTHER PUBLICATIONS

Z. Mayer, J. Li, A. Papadogiannis, and T. Svensson, "On the impact of control channel reliability on coordinated multi-point transmission," EURASIP Journal on Wireless Communications and Networking, No. 2014:28, 2014.

T. A. Khan, P. Orlik, K. J. Kim, and R. W. Heath, "Performance analysis of cooperative wireless networks with unreliable backhaul links," IEEE Commun. Lett., vol. 19, No. 8, pp. 1386-1389, Aug. 2015.

Institute of Communications and Navigation, "Final report of the maritime traffic engineering projects: E-navigation integrity," 2015. Online, http://www.dir.de/kn/en/Portaldata/27/Resources/dokumente/04_abteilungen_nas/MVT-Final-Report(Final).pdf.

I. Trigui, S. Affes, and A. Stephenne, "Ergodic capacity of two-hop multiple antenna AF systems with co-channel interference," IEEE Wireless Commun. Lett., vol. 4, No. 1, pp. 26-29, Feb. 2015.

S. S. Ikki and S. Aissa, "Multihop wireless relaying systems in the presence of cochannel interferences: Performance analysis and design optimization," IEEE Trans. Veh. Technol., vol. 61, pp. 566-573, Feb. 2012.

M. Xia and S. Aissa, "Impact of co-channel interference on the performance of multi-hop relaying over Nakagami-m fading channels," IEEE Wireless Commun. Lett., vol. 3, No. 2, pp. 133-136, Apr. 2014.

* cited by examiner

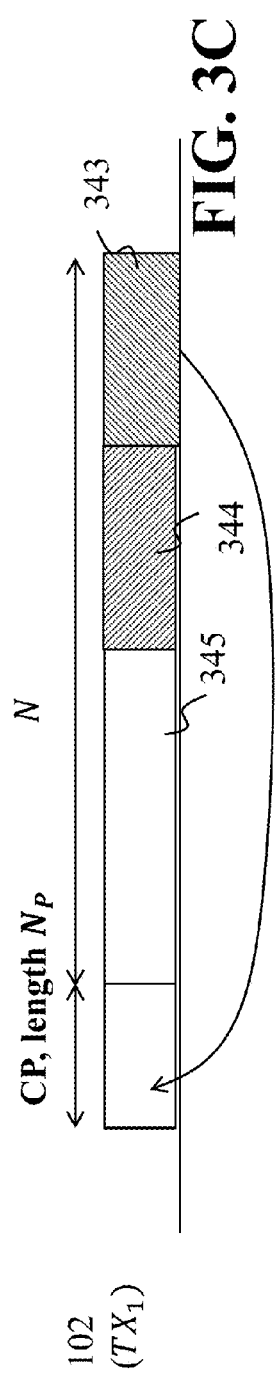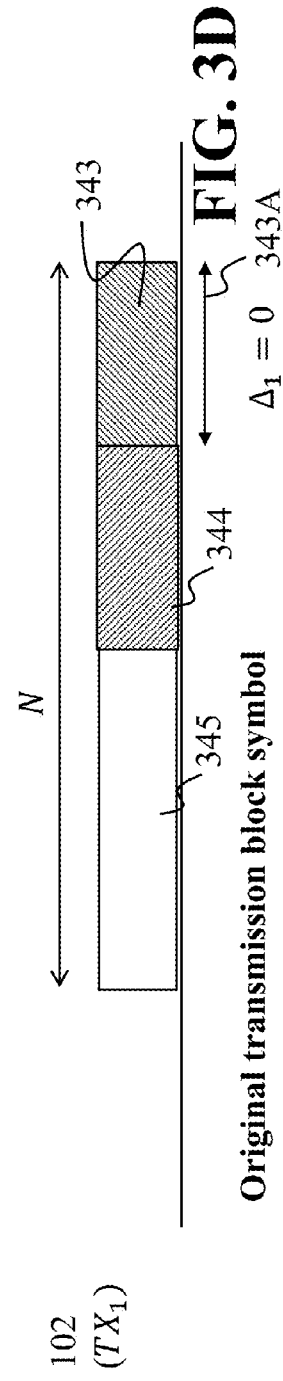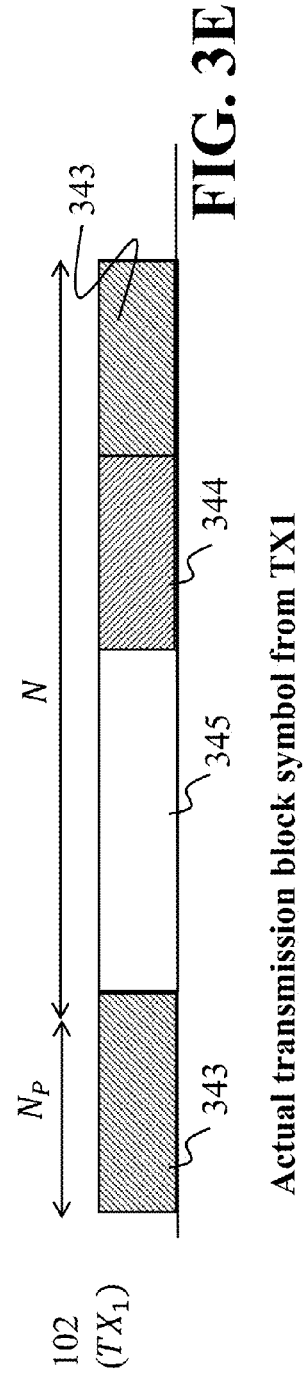

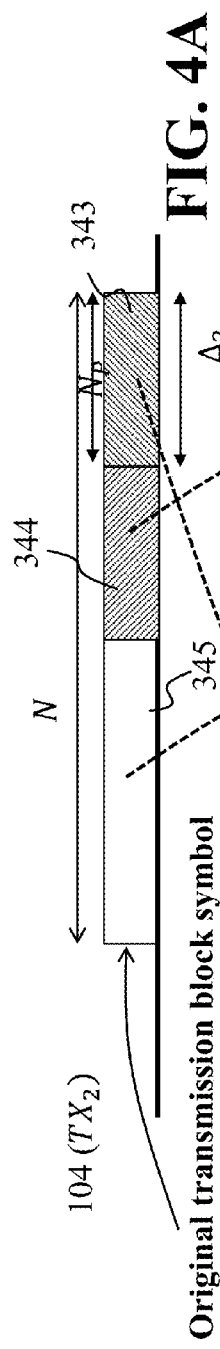
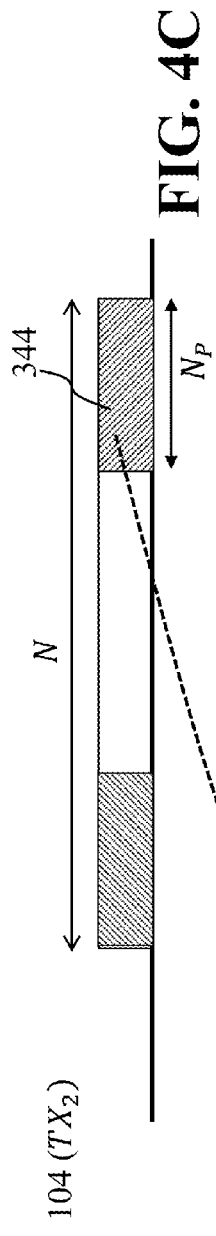
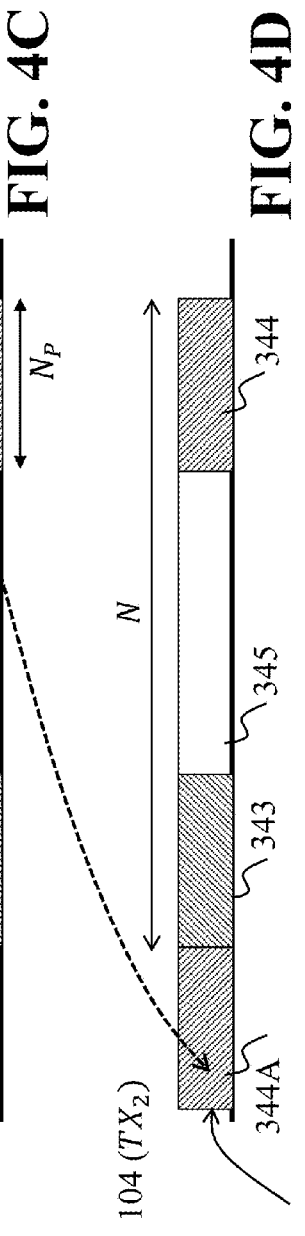

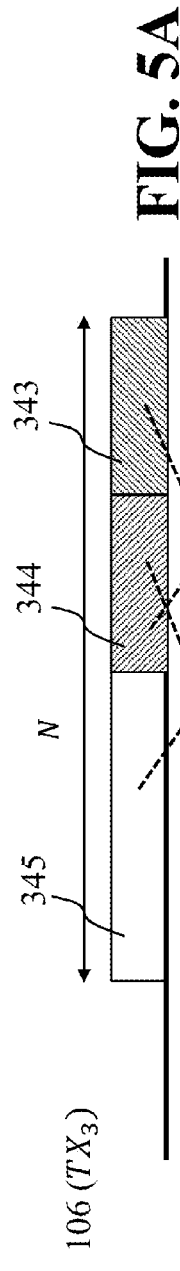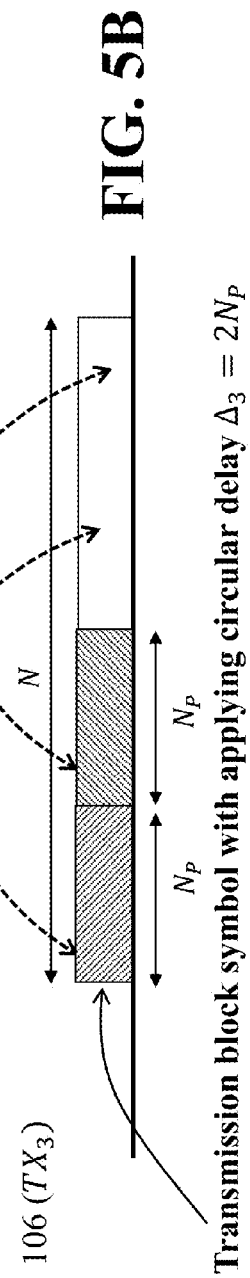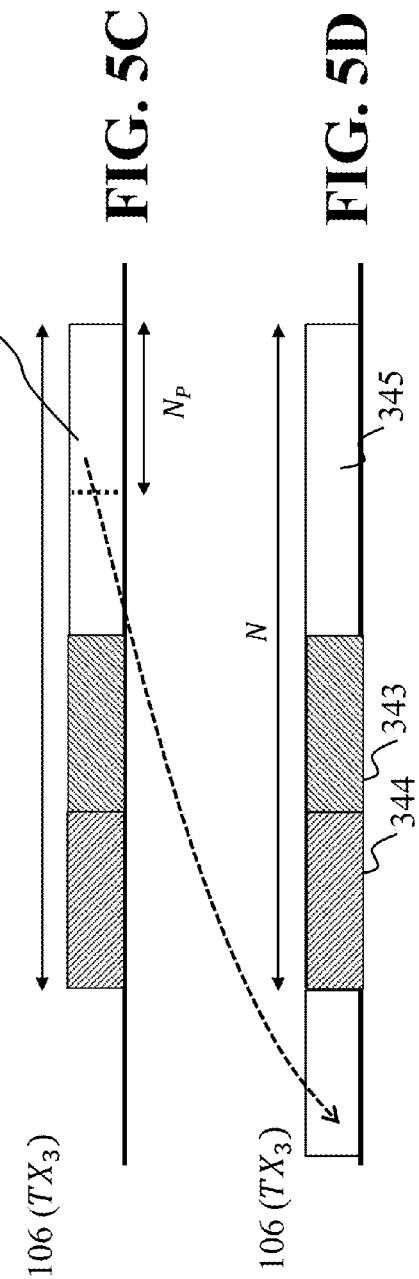

METHOD AND SYSTEMS USING QUASI-SYNCHRONOUS DISTRIBUTED CDD SYSTEMS

FIELD

The present disclosure relates to methods and systems for communication networks, and more particularly to determining lengths of cyclic prefixes in communication systems.

BACKGROUND

There is an increasing interest to increase the data throughput and to make more efficient use of the available spectrum in wireless data communication systems. Orthogonal Frequency Division Multiplexing (OFDM) modulation techniques with fixed cyclic prefixes are being used as one of the methods to achieve these goals. However, depending upon the application of the communication system, for example, intelligent transportation networks, maximum efficiency use of the available spectrum is certainly valued and sought after, but more importantly, the reliability on performance of the communication system/network is more valued and even imperative, when considering sustained economic success for the intelligent transportation service provider along with ensuring their consumer's safety.

The OFDM is a form of multi-carrier modulation scheme that is capable of overcoming the frequency selectivity of the radio channels and providing high data rates without an Inter-Carrier Interference (ICI) and other interferences. However, in multipath fading channels, the time variation of a fading channel over an OFDM symbol period destroys the orthogonality between the sub-channel. A circular extension, i.e., cyclic prefix, is added at the front of OFDM symbols in order to eliminate both intersymbol interference (ISI) and other interferences. For example, the cyclic prefix, which is a copy of an end of an OFDM symbol is placed at the beginning, and often used to address dispersion associated with multipath channel. The cyclic prefix, if not long enough to cover the delay spread of the wireless channel can result in having an unreliable network. However, the cyclic prefixes of each OFDM symbol, however, consume significant bandwidth and therefore reduce throughput. Also, the cyclic prefix is a predetermined and has a fixed length.

Thus, there is a need for communication systems and methods for communicating content over wireless communication networks that use cyclic prefixes to provide reliable and improved throughput.

SUMMARY

Embodiments of the present disclosure provide systems and methods for communication networks for determining lengths of cyclic prefixs that result in reliable and improved throughput.

Some embodiments of the present disclosure are based on the realization that a cooperative communication system may have a distributed cyclic delay diversity (CDD) scheme, that includes a set of spatially distributed cooperating transmitters, rather than only one transmitter as traditional CDD schemes are conventionally constructed. For example, embodiments of the present disclosure can use a Global Positioning System (GPS) that includes a universal clock which can be used to provide timing for a control unit (CU). The control unit may synchronize the set of transmitters within the CDD scheme to correct for a propagation delay and obtain a universal clock for the cooperative communication system, which results in reducing the need for tight synchronization within the system. This universal clock provides synchronization that achieves and maintains coordination among the local clocks in the independent set of transmitters to provide a common notion of time across the set of transmitters in the cooperative communication system as disclosed in the present disclosure. Based on this configuration, an average time error produced by the GPS receiver may be reduced within 100 nanoseconds, among other things. Thus, by knowing the components of the cooperative communication system, i.e., CDD scheme, transmitters, receivers and GPS timing, etc., it is possible to determine a synchronization delay or synchronization error for the cooperative communication system specific to the present disclosure.

Taking into account this synchronization error, the systems and methods of the present disclosure are also based on another realization, of combining the synchronization error with a maximum tap delay of the set of cooperating transmitters, to obtain a minimum length CP. For example, a tap delay can be determined for a communication channel between a receiver and each transmitter in the set of transmitters to produce a set of tap delays for the cooperative communication system. Wherein, a maximum tap delay may be obtained from the set of tap delays. The realization was made by combining the synchronization error with the maximum tap delay, to obtain a minimum length CP which can be used for transmitting a message, via the set of transmitters.

Based upon the realization of incorporating a minimum length CP with the CDD scheme of the present disclosure, there were many realizations discovered. For example, by taking into account the synchronization error and the multipath delay together, the maximum CP is determined for all the transmitters which resulted in substantially removing intersymbol interferences (ISI) along with achieving a maximum diversity gain possible by the distributed CDD.

At least one advantage, among many advantages of the distributed CDD of the present disclosure, is being able to achieve the diversity gain by transmitting a common symbol block without requiring channel state information (CSI) at the transmitters. Furthermore, the distributed CDD of the present disclosure demonstrated that full diversity gain can be achieved without employing forward error correction (FEC) coding by employing cyclic-prefixed single carrier (CP-SC) transmission with CDD under some requirements. In addition, the use of distributed CDD or cooperative CDD of the present disclosure, provides a more reliable communication network, among other things.

According to some embodiments, given the CP-SC transmission scheme of the present disclosure, the collaborating transmitter can adjust their individual delays in such a way so that the transmission does not mutually interfere with one another. Furthermore, embodiments of the present disclosure adjusting delays does not require the full channel state information at the transmitters, as noted above.

According to an embodiment of the present disclosure, a communication system including a set of transmitters, wherein operations of the set of transmitters are synchronized with an accuracy bound by a synchronization error. A controller communicatively connected to each transmitter in the set of transmitters, wherein the controller is configured to: determine a tap delay for a communication channel between a receiver and each transmitter in the set of transmitters to produce a set of tap delays. Determine a minimal length of a cyclic prefix as a function of a sum of the synchronization error and a maximal tap delay in the set of tap delays. Determine a number of transmitters to apply a cyclic delay diversity (CDD). Finally, controls at least some transmitters in the set of transmitters to transmit a message to the receiver using a cyclic delay diversity (CDD) with the cyclic prefix having at least the minimal length.

According to another embodiment of the present disclosure, a method for transmitting a message that is a non-data-aided signal from transmitters in a set of transmitters to a receiver, wherein operations of the transmitters are synchronized with a synchronization error. The method including determining a tap delay for each communication channel between the receiver and each transmitter in the set of transmitters to produce a set of tap delays. Determining a minimal length of a cyclic prefix as a function of a sum of the synchronization error and a maximal tap delay in the set of tap delays. Finally, transmitting the message from at least some transmitters using a cyclic delay diversity (CDD) with the cyclic prefix having at least the minimal length, wherein steps of the method are performed by a processor.

According to another embodiment of the present disclosure, a non-transitory computer readable storage medium embodied thereon a program executable by a processor for performing a method. The method including acquiring a synchronization error bounding an accuracy of a synchronization of operations of a set of transmitters. Determining a tap delay for a communication channel between a receiver and each transmitter in the set of transmitters to produce a set of tap delays. Determining a minimal length of a cyclic prefix as a function of a sum of the synchronization error and a maximal tap delay in the set of tap delays. Finally, transmitting a message using a cyclic delay diversity (CDD) with the cyclic prefix having at least the minimal length.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3C is a schematic illustrating step 332 of FIG. 3A, according to embodiments of the present disclosure;

FIG. 3D and FIG. 3E are schematics illustrating step 352 of FIG. 3A, according to embodiments of the present disclosure;

FIG. 4A to FIG. 4D are schematics illustrating step 362 of FIG. 3A, according to embodiments of the present disclosure;

FIG. 5A to FIG. 5D are schematics illustrating step 372 of FIG. 3A, according to embodiments of the present disclosure;

Figure 1A:
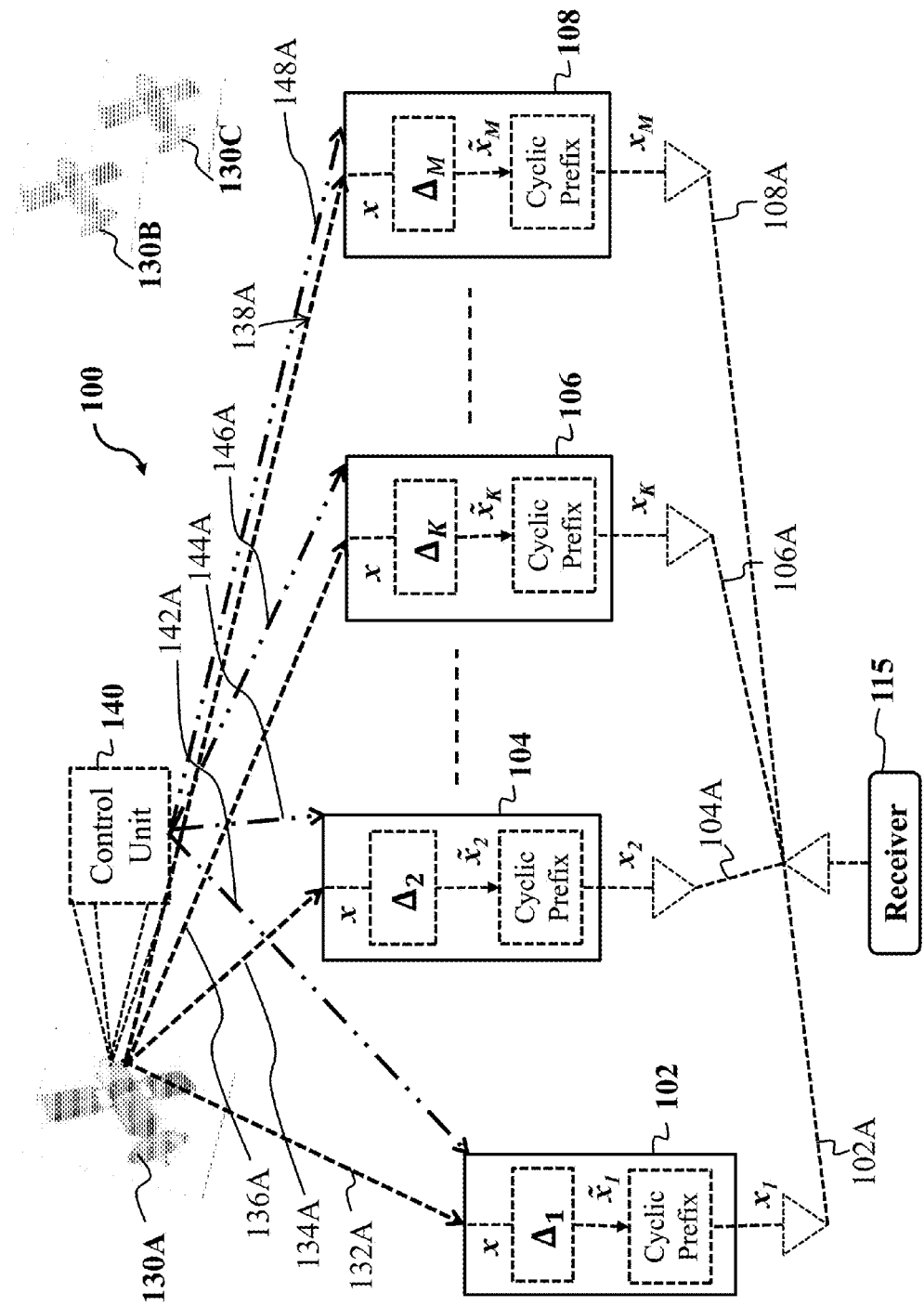
FIG. 1A is a schematic of a method for communication networks that includes determining lengths of cyclic prefixs in communication systems and the number of transmitters, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1A is a schematic of a method for communication networks that includes determining lengths of cyclic prefixs in communication systems, according to embodiments of the present disclosure. Communication system 100 includes a receiver 115 in communication with transmitters 102, 104, 106, and 108 via wirelessly 102A, 104A, 106A, and 108A. The control unit (CU) 140 is also in communication with M transmitters via channels 142A, 144A, 146A, and 148A, respectively. Further, the CU 140 is in communication with a Global Positioning System (GPS) 130A that includes a universal clock which can be used to provide timing for the control unit (CU) 140. Contemplated is that the communication may be in communication with other GPS systems 130B, 130C. The control unit 140 in communication with GPS 130A may synchronize the set of transmitters 102, 104, 106, and 108 within the CDD scheme to correct for a propagation delay, which results in reducing the need for tight synchronization within the communication system. The universal clock of GPS 130A provides synchronization that achieves and maintains coordination among the local clocks in the independent transmitters of the set of transmitters 102, 104, 106, and 108 to provide a common notion of time across the set of transmitters in the cooperative communication system.

Figure 1B:
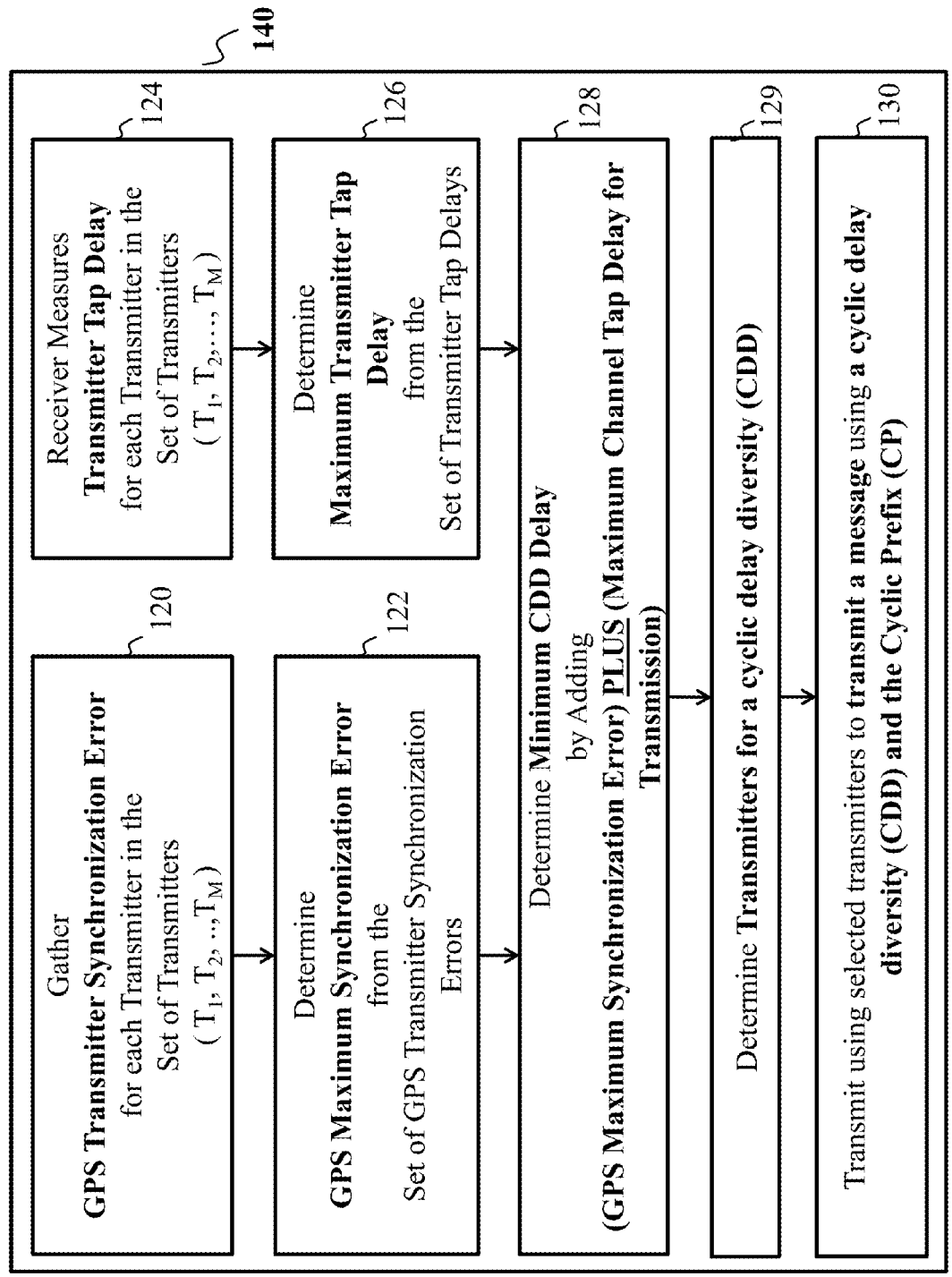
FIG. 1B is a flow diagram of the method of FIG. 1A, according to an embodiment of the present disclosure.

FIG. 1B is a flow diagram of the method of FIG. 1A, according to an embodiment of the present disclosure.

Step 120 of FIG. 1B includes gathering the GPS Transmitter Synchronization Error ($\Delta S_1, \ldots, \Delta S_M$) for each Transmitter in the set of Transmitters ($T_1, T_2, \ldots, T_M$). Based on the current GPS signal, the bound on the GPS transmitter synchronization error can be found off line in line with the symbol time $T_S$. For example, a paper, "Design study for a quasi-synchronous CDMA sensor data collection system: An LEO satellite uplink access technique based on GPS", by Yijun Chen, et al in 2015, specifies the synchronization error bound $\Delta S_{bound}$ in 150 ns in year 2002. Thus, when at least four satellites are in view at a particular time instance, then all of $\Delta S$'s are assumed to be less then $\Delta S_{bound}$.

Step 122 of FIG. 1B includes determining GPS Maximum Synchronization Error from the set of GPS Transmitter Synchronization Errors. Based on the current GPS signal, the bound on the GPS transmitter synchronization error $\Delta S_{bound}$ can be found off line. To work even in worst applications, the system needs to consider the worst synchronization error (maximum sync error) $\Delta S_{bound}$ to remove its possible appearance as inter-symbol interference. Therefore the synchronization error bound, $\Delta S_{bound}$, is considered as an upper bound on the error.

Step 124 of FIG. 1B includes the receiver measuring the transmitter Tap Delay for each Transmitter in the set of transmitters ($T_1, T_2, \ldots, T_M$). Each receiver can measure the maximum tap delay via channel sounding techniques, where the transmitters (102, 104, 106, and 108) send known pilot signals to the receiver which then measures the extent of the channel dispersion. Without an exact knowledge of the maximum tap delay, the receiver will experience inter-symbol interference. Thus, to achieve a better reliability of the receiving signal, it is necessary that the coordination processer, 141A, only knows of the maximum tap delays rather than the full channel state information.

Step 126 of FIG. 1B includes determining the maximum transmitter tap delay from the set of transmitter tap delays. The receiver 115 computes the delay spread of each channel between itself and the transmitters. Once the receiver has the set of channel delays ($N_{f1}, \ldots, N_{fM}$) it sorts them and then chooses the largest delay $N_f = \max(N_{f1}, \ldots, N_{fM})$ from the measurements.

Step 128 of FIG. 1B includes determining the minimum CDD delay length by adding the GPS maximum synchronization error $\Delta S_{bound}$ plus the maximum transmitter tap delay $N_f$. It is important to satisfy the least overhead ratio of the additional CP length $N_p$ to the original symbol block size N. In general, less overhead (i.e., shorter CP length) is preferable. For example, if the CP length is reduced, then the transmission time can be increased. However, if we reduce the CP length without a limit, then interference will appear at the receiver. Thus, it is required to satisfy two goals; to reduce the CP length while to remove the interference at the receiver. Since the time synchronization between distributed transmitters affect the receiver performance, time synchronization error should be considered. In this aspect, we also take account the worst time synchronization error. To remove interference from the receiving signal, we need to have $N_P \geq N_f + \Delta S_{bound}$. To have the least overhead ratio, we use the CP length as $N_P = N_f + \Delta S_{bound}$. According to the computed $N_P$, the CDD delay is determined as $\Delta_i = (i-1)N_P$ with $\Delta_1 = 0$. It is noted that the result is that CP needs to extend beyond the longest channel delay spread and the effect of the GPS timing error bounds.

Step 129 of FIG. 1B determines K transmitters out of M ($M \geq K$) transmitters in applying CDD. With respect to the transmission block size N, the number of transmitters is determined by $K = 1 + \text{floor}(N/N_P)$, where floor(.) denotes the floor function. Then, the next question is how to choose K transmitters. To determine which transmitters will be chosen out of M transmitters, the receiver 115 computes the set of effective signal-to-noise ratios (SNRs) over the channels from the transmitters (102A, 104A, 106A, and 108A) to the receiver 115. For the same pilots symbols, the effective SNR for the kth transmitter is given by $\gamma_k = P_T \|h_k\|^2 / \alpha_n^2$, where $P_T$ denotes the transmit power from the transmitters, $\alpha_n^2$ denotes the noise power, and $\|h_k\|^2$ denotes the channel power for a channel vector $h_k$. Then, the receiver sorts these effective SNRs to obtain the corresponding transmitter index. For instance, (2,1,4,3) indicates that transmitter 3 has the largest effective SNR and transmitter 2 has the smallest effective SNR out of four transmitters. The receiver sends back this transmitter index, e.g., (2,1,3,4), to the control unit (CU). Then, the control unit chooses the K transmitters which are indexed by the last K elements of the received transmitter indexing vector. For instance, when K=2 transmitters are supported by CDD, then the control unit selects transmitter 3 and transmitter 4 for CDD since these two transmitters provide two largest effective SNRs at the receiver. Since the receiver 115 sends back only the transmitter index, the feedback overhead can be reduced.

Step 130 of FIG. 1B includes Transmitting using transmitters from the set of transmitters determined by Step 129 to transmit a message using a cyclic delay diversity (CDD) with the CDD delay and cyclic prefix. CDD is the processing that is applying a different CDD delay $\Delta_i$ to a different transmitter. After applying the CDD operation, apply the cyclic prefix that is appending the last symbols where its number is same as the length of the cyclic prefix to the front of the original transmission symbol block.

Figure 1C:
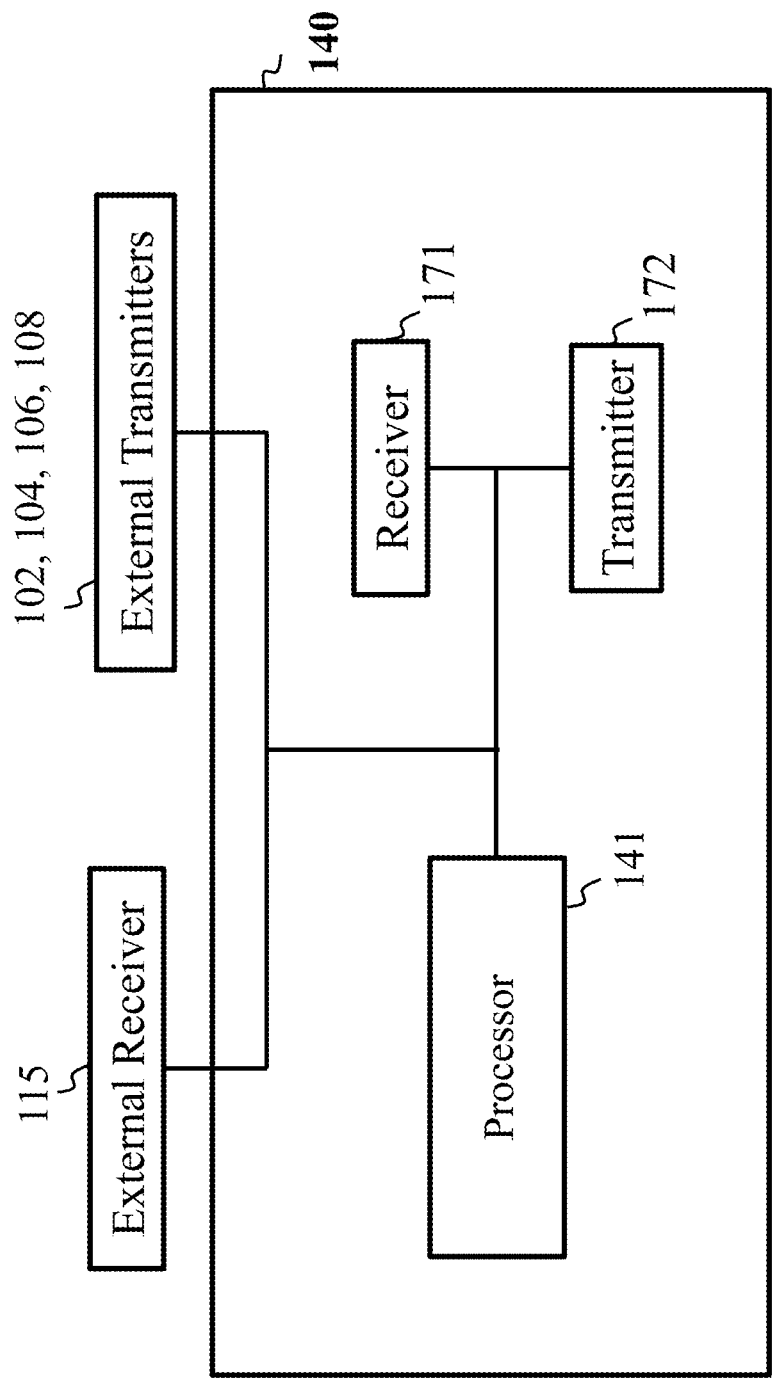
FIG. 1C is a block diagram of a control unit of FIG. 1A that includes a processor for controlling the communication system, according to an embodiment of the present disclosure.

FIG. 1C is a block diagram of a control unit 140 that includes a processor 141A for controlling the communication system, in accordance with some embodiments of the present disclosure. Control unit gathers the maximum time synchronization error and the measured maximum channel tap length from the receiver. Computes the maximum allowable number of transmitters considering the maximum channel tap length, maximum time synchronization error, and the transmission symbol block size. Chooses a number of transmitters that applies CDD. Assigns a different delay to a chosen transmitter. According to Step 124 and 126, the receiver computes the maximum channel tap length. Step 128 provides the way to compute the CP length and the CDD delays taking account for maximum time synchronization error. According to Step 129, the control unit 140 determines transmitters that apply CDD. Then, the control unit provides a selected CDD delay $\Delta_i$ for a transmitter one by one. It is noted that there is a relationship between the length of the CP and the value of $\Delta$ that is used in the CDD, such that we want to fit all of the transmitter CDD delays within this limit.

Figure 1D:
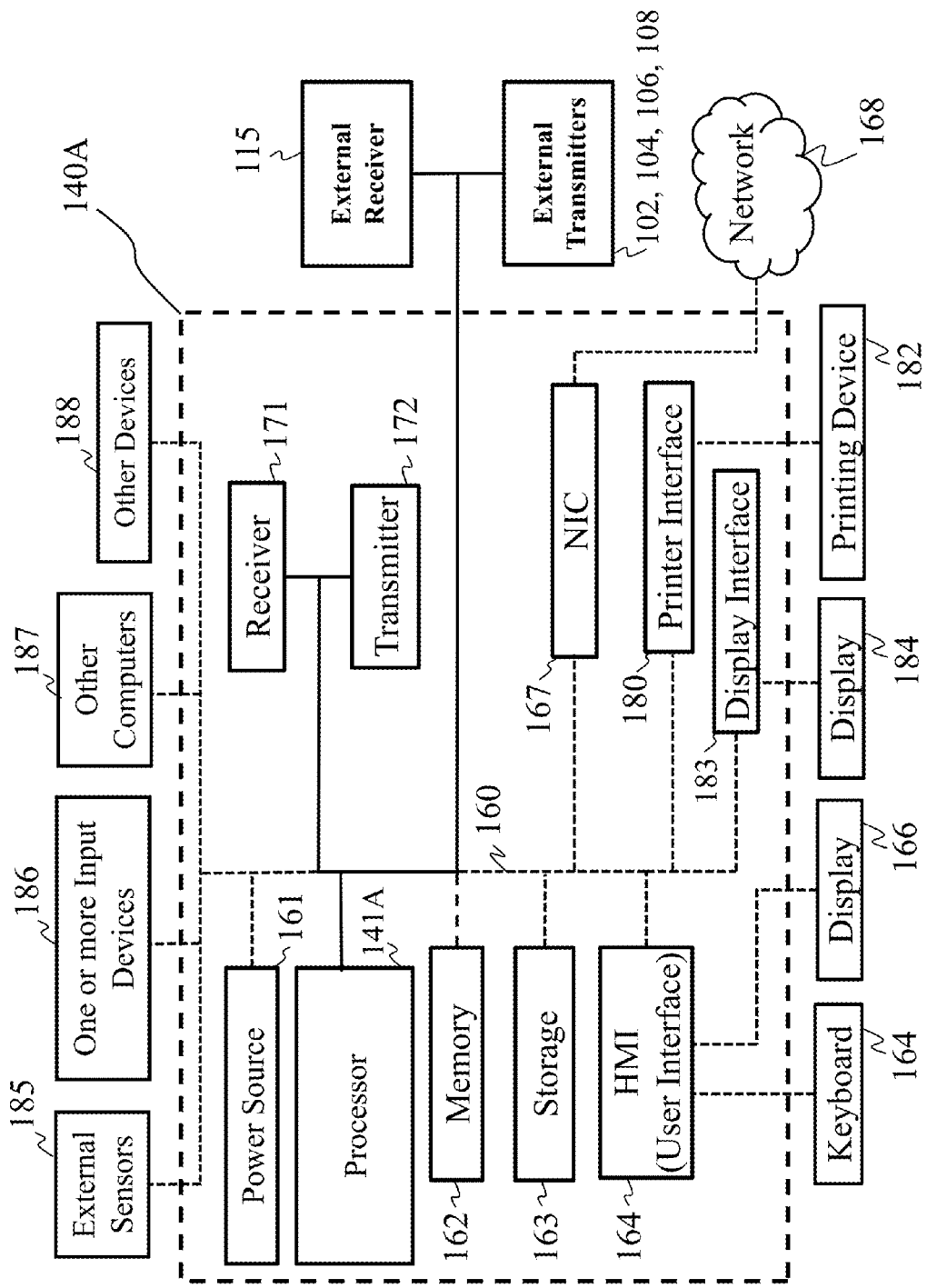
FIG. 1D is a block diagram of another control unit that includes a coordination processor for controlling the communication system, according to some embodiments of the present disclosure.

FIG. 1D is a block diagram of a control unit 140 that includes the processor 141A for controlling the communication system, in accordance with some embodiments of the present disclosure. The processor may be any type of processor configured for communication and network system operations. The control unit 140 can include a power source 161, depending upon the application the power source may be optionally located outside of the control unit 140. The processor 141A can be configured to execute stored instructions, as well as be in communication with a memory 162 that stores instructions that are executable by the processor 141A. The processor 141A can be a single core processor, a multi-core processor, a computing cluster, or any number of other configurations. The Coordination processor 141A is connected through a bus 160 to one or more input and output devices 186. The memory 162 can include random access memory (RAM), read only memory (ROM), flash memory, or any other suitable memory systems. It is contemplated the processor can be a coordination processor responsible for determining and communicating the parameters. i.e. number of transmitters, CDD delays, CP sizes, for the system, among other things.

Still referring to FIG. 1D, the control unit 140 can also include a storage device 163 adapted to store supplementary data and/or software modules used by processor 141A. For example, the storage device 163 can store historical data relating to similar different types of communication networks and systems, related to for example, CP configurations, transmitter configurations, receiver configurations, synchronization error data, etc., among other things. The storage device 163 can include a hard drive, an optical drive, a thumb-drive, an array of drives, or any combinations thereof.

A human machine interface (HMI or User Interface) 164 within the control unit 140 can connect the system to a keyboard 164 and display device 166. The control unit 140 can be linked through the bus 160 to a display interface 183 adapted to connect to a display device 184, wherein the display device 184 can include a computer monitor, camera, television, projector, or mobile device, among others.

Still referring to FIG. 1D, a printer interface 180 can also be connected through bus 160 and adapted to connect to a printing device 182, wherein the printing device 182 can include a liquid inkjet printer, solid ink printer, large-scale commercial printer, thermal printer, UV printer, or dye-sublimation printer, among others. A network interface controller 167 is adapted to connect through the bus 160 to a network 168. The communication data or related communication data, among other things, can be rendered on a display device, imaging device, and/or printing device.

Still referring to FIG. 1D, the communication data or related communication data, among other things, can be transmitted over a communication channel of the network 168, and/or stored within the storage system 163 for storage and/or further processing. Further, the communication data or related communication data may be received wirelessly or wire from a receiver 171 or transmitted via a transmitter 172 wirelessly or wire, the receiver and transmitter are both connected through the bus 160 to the control unit 140.

The control unit 140 may be connected to external sensors 185. For example, the external sensors 185 may include sensors for, speed, direction, air flow, weather conditions, etc. The control unit 140 may be connected to other external computers 187.

Figure 2A:
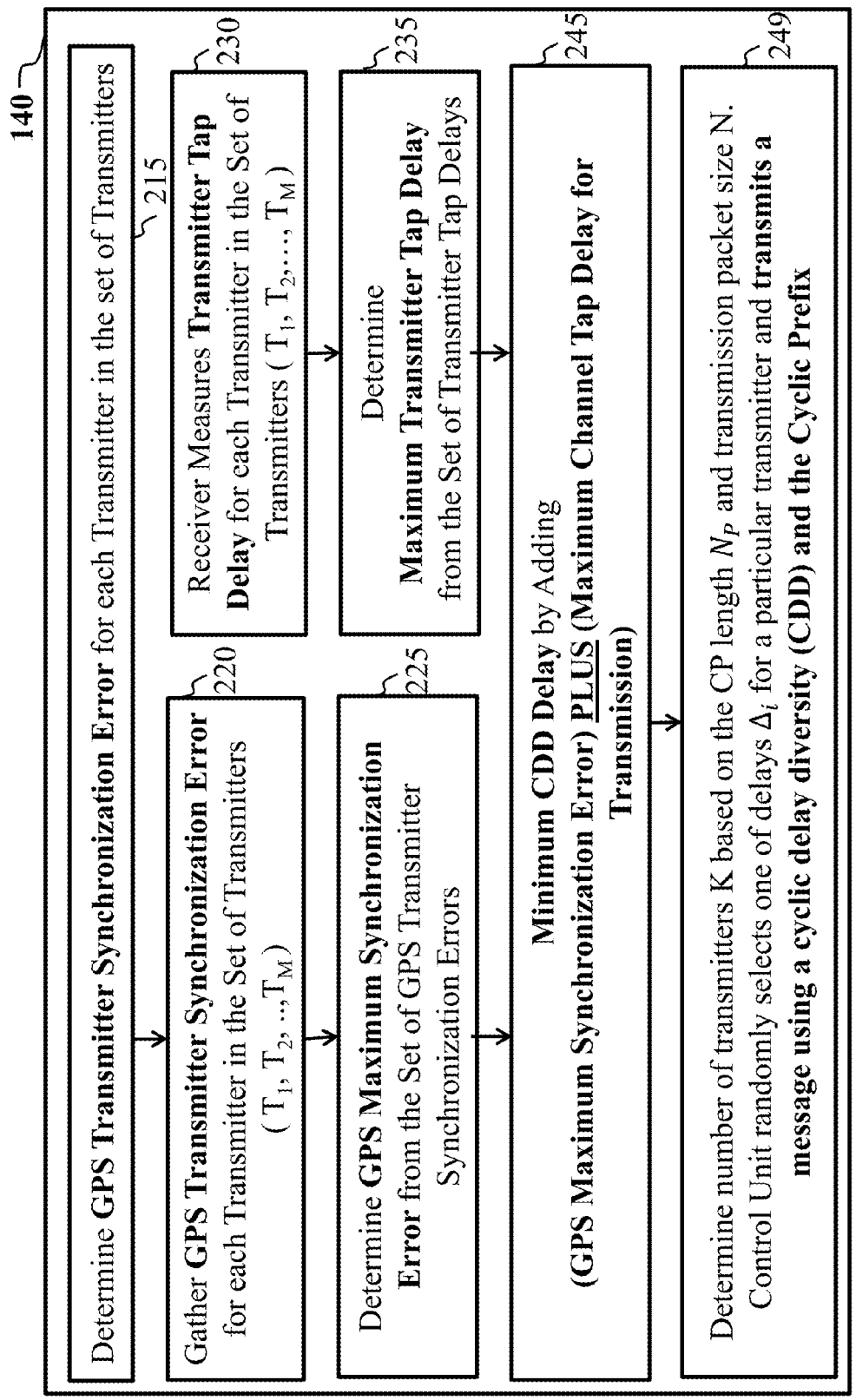
FIG. 2A is a flow diagram of another method, according to some embodiments of the present disclosure.

FIG. 2A is a flow diagram of another method, according to embodiments of the present disclosure.

Step 215 of FIG. 2A includes determining the GPS transmitter synchronization error for each transmitter in the set of transmitters.

Step 220 of FIG. 2A includes gathers the GPS transmitter synchronization errors ($\Delta S_1, \ldots, \Delta S_M$) for each transmitter in the set of transmitters ($T_1, T_2, \ldots, T_M$).

Step 225 of FIG. 2A includes determining GPS Maximum Synchronization Error from the set of GPS Transmitter Synchronization Errors.

Step 230 of FIG. 2A includes the receiver measuring the transmitter Tap Delay for each Transmitter in the set of transmitters ($T_1, T_2, \ldots, T_M$).

Step 235 of FIG. 2A includes determining the maximum transmitter tap delay from the set of transmitter tap delays.

Step 245 of FIG. 2A includes determining the minimum CDD delay by adding the GPS maximum synchronization error plus the maximum transmitter tap delay.

Step 249 of FIG. 2A includes determining the number of transmitters K based on maximum channel tap length $N_f$, synchronization error bound $\Delta S_{bound}$ and transmission block size N. Since there may be more number of transmitters that CDD can support, it is necessary to determine what the maximum number of transmitters will need to be. To do this, the packet size needs to be considered to remove interference. The control unit randomly selects one of delays $\Delta_i$ for a particular transmitter and transmits a message using a cyclic delay diversity (CDD) with the Minimum Length of Cyclic Prefix. If we use the maximum likelihood detector for data detection in the receiver, then the detector performance is independent of the different delay when the equivalent channel matrix is circulant. Thus, the control unit randomly selects any one of the delays that were not chosen for other transmitters for a particular transmitter and then controls this transmitter to transmit a message using the cyclic delay diversity.

Figure 2B:
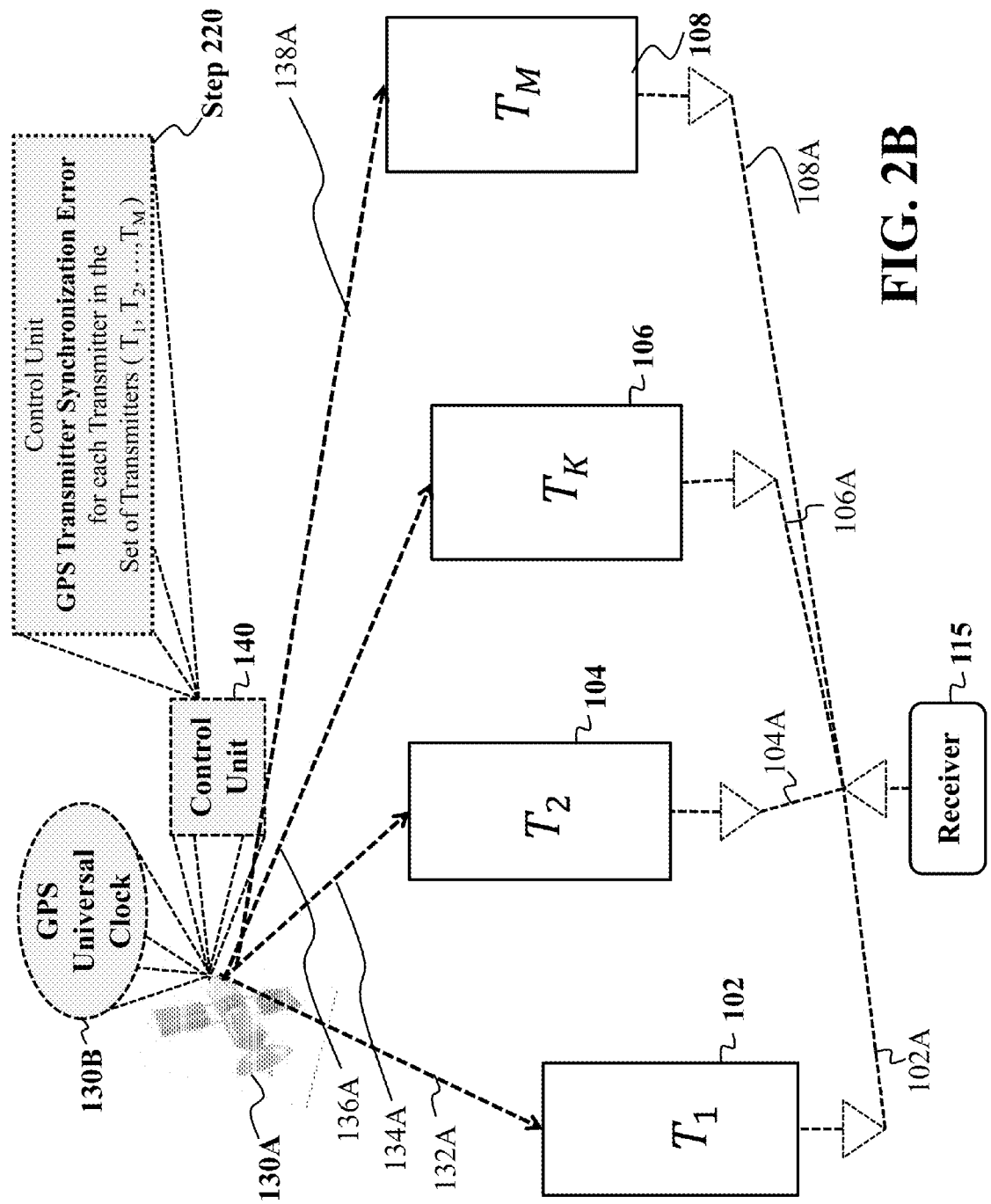
FIG. 2B is a schematic illustrating step 220 of FIG. 2A, according to embodiments of the present disclosure.

FIG. 2B is a schematic illustrating step 220 of FIG. 1, according to embodiments of the present disclosure. The control unit gathers time synchronization error off line.

Figure 2C:
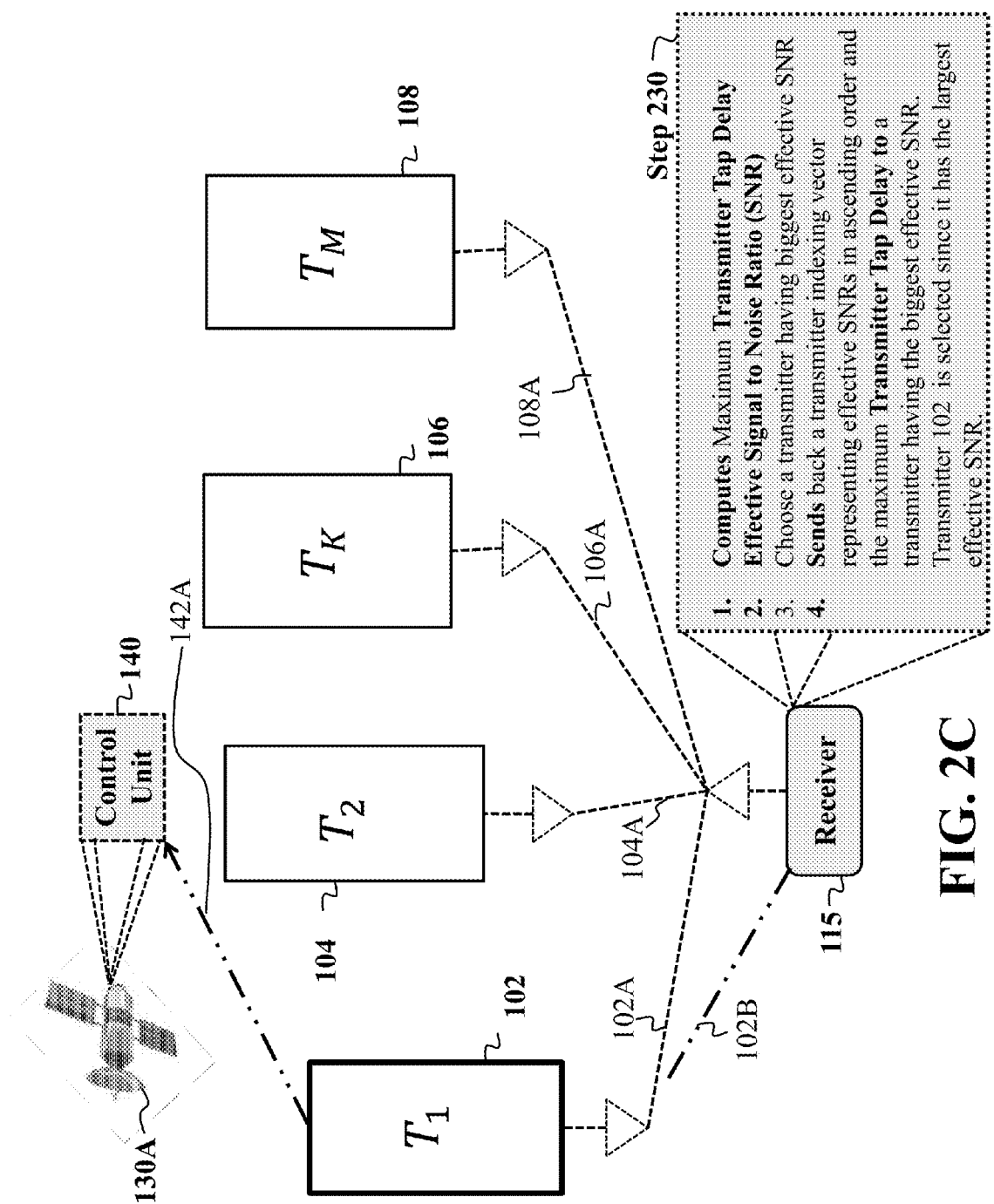
FIG. 2C is a schematic illustrating step 230 of FIG. 2A, according to embodiments of the present disclosure.

FIG. 2C is a schematic illustrating step 230 of FIG. 1, according to embodiments of the present disclosure. The receiver operation can measure tap delays ($N_{f1}, N_{f2}, \ldots, N_{fm}$) for the links between the transmitters and itself, and then computes the maximum tap delay $N_f$=max($N_{f1}$, $N_{f2}, \ldots, N_{fm}$). It also measures the effective received signal-to-noise ratios (SNRs) at the receiver over the channels (102A, 104A, 106A, and 108A). It sorts the effective received SNRs in terms of their magnitudes, and chooses a transmitter that has the largest magnitude. For example, Transmitter 1 (102). For the CDD operation, the receiver 115 sends back a transmitter indexing vector representing effective SNRs in ascending order, for example, (2,1,4,3), and the maximum Transmitter Tap Delay $N_f$ to Transmitter 102 via a channel 102A.

For example, in Step 230, the receiver first measures the transmitter tap delay for each transmitter in the set of transmitters ($T_1, T_2, \ldots, T_M$) and then compute the maximum transmitter tap delay. Second, includes an effective signal to noise Ratio (SNR), for each channel in the set of channels 102A, 104A, 106A, 108A. The receiver, then sorts effective SNRs and chooses a transmitter having the biggest effective SNR. Then, sends back a transmitter indexing vector representing effective SNRs in ascending order and the maximum transmitter tap delay to a transmitter having the biggest effective SNR. In this example, transmitter 102 is selected since it has the largest effective SNR.

FIG. 2C is a schematic illustrating step 231 of FIG. 1, according to embodiments of the present disclosure. After receiving a transmitter indexing vector representing effective SNRs in ascending order and the maximum Transmitter Tap Delay from receiver 115 via a channel 102A, it sends back this information to the control unit 140 via a channel 142A.

Figure 3A:
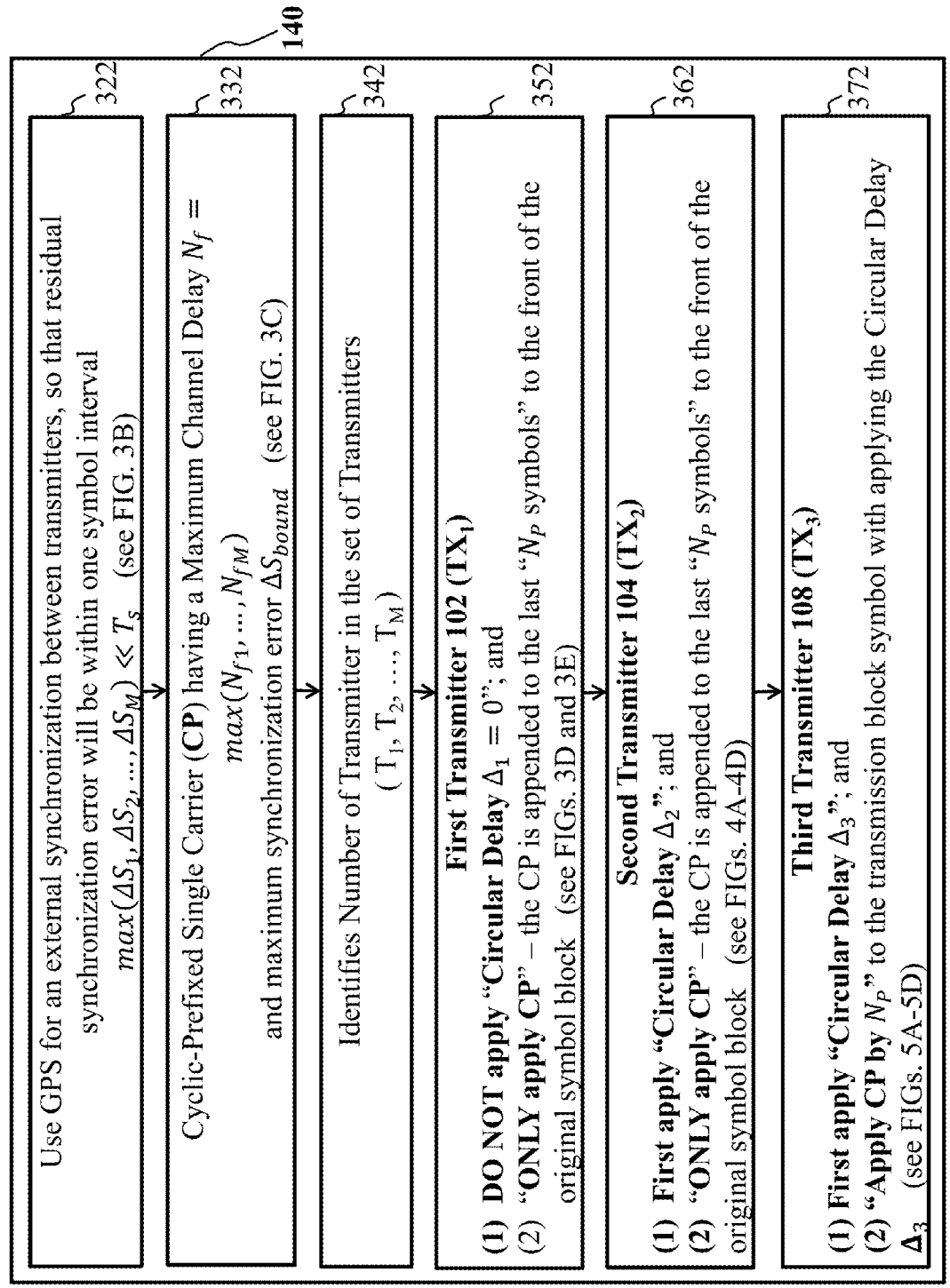
FIG. 3A shows is a block diagram illustrating a flow chart implementing the minimum cyclic prefix into the message, according to embodiments of the present disclosure.
Figure 3B:
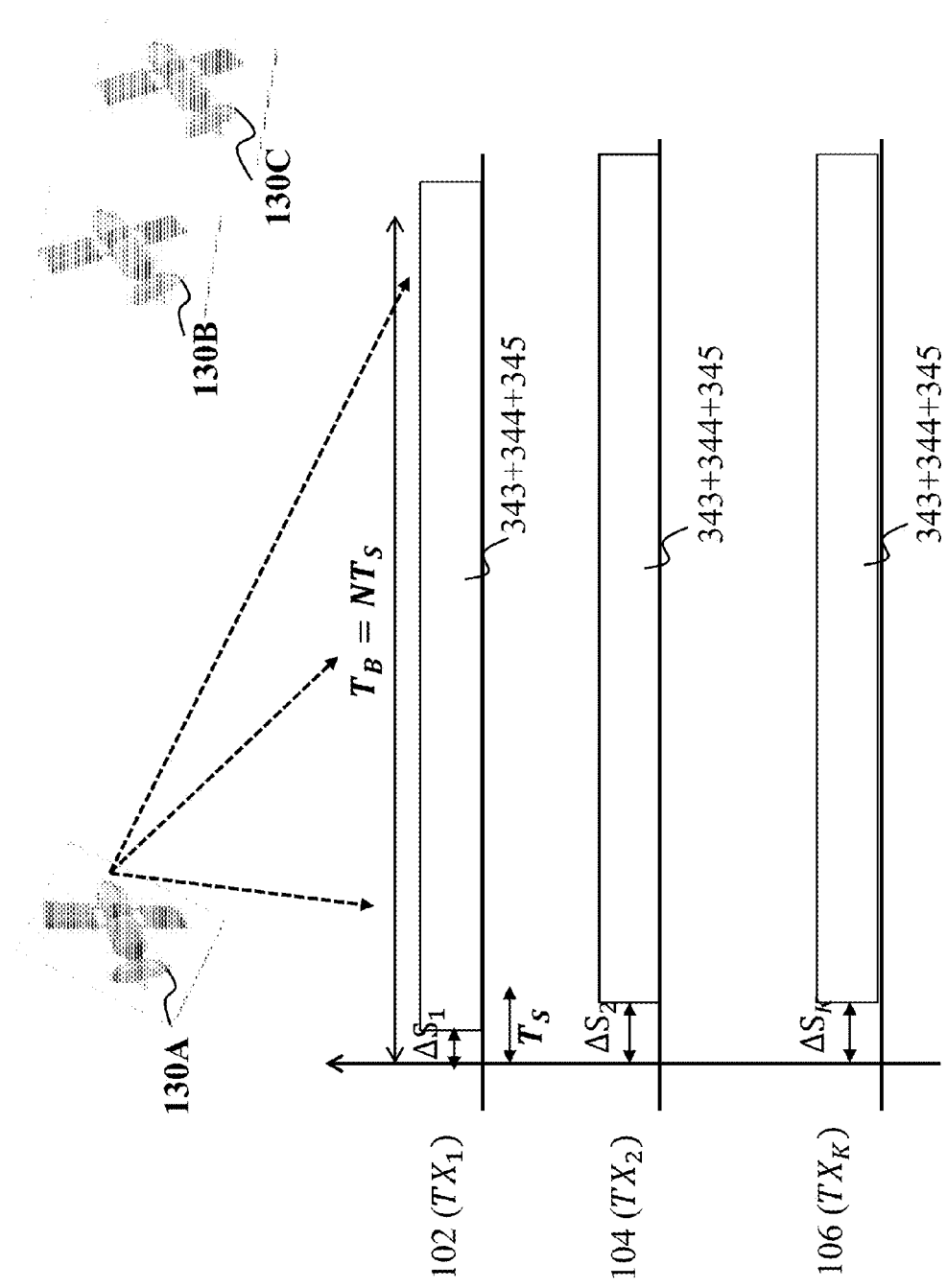
FIG. 3B is a schematic illustrating step 322 of FIG. 3A, according to embodiments of the present disclosure.

FIG. 3B is a schematic illustrating step 322 of FIG. 3A, according to embodiments of the present disclosure. This shows that a different transmitter may experience different time synchronization. They are all smaller than one symbol interval $T_S$.

FIG. 3C is a schematic illustrating step 332 of FIG. 3A, according to embodiments of the present disclosure; FIG. 3C shows the CP operation that appends the multiple number of symbols to the front of the transmission block symbol.

FIG. 3D and FIG. 3E are schematics illustrating step 352 of FIG. 3A, according to embodiments of the present disclosure; For example, transmitter 102 does not apply the CDD due to $\Delta_1=0$ (FIG. 3D), such that transmitter 102 only applies the cyclic prefix, that is, a copy of the cyclic prefix, block 343 is appended to the front of block 345.

FIG. 4A to FIG. 4D are schematics illustrating step 362 of FIG. 3A, according to embodiments of the present disclosure. FIG. 4A illustrates the second transmitter that applies $\Delta_2=N_p$ for the CDD delay, that is, block 343 is the first cyclic delayed. Along with this part, every parts in the original transmission block symbol are right shifted (FIG. 4B). FIG. 4C shows the transmission block structure after applying the CDD delay. In FIG. 4C, the length of block 344 is equal to P. In FIG. 4D, apply the CP. That is, block 344 is appended to the front of block 343. Thus, FIG. 4D shows actual transmission block symbol from transmitter 104.

FIG. 5A to FIG. 5D are schematics illustrating step 372 of FIG. 3A, according to embodiments of the present disclosure; FIG. 5A shows the third transmitter that applies $\Delta_3=2N_P$ for the CDD delay, that is, blocks 343 and 344 are cyclically delayed (FIG. 5B). Every part should right shifted by $2N_P$. A part of 345, that is, 345A, should be used as a prefix. Thus, block 345A is appended to the front of block 344. FIG. 5D shows actual transmission block symbol from transmitter 106.

Figure 6:
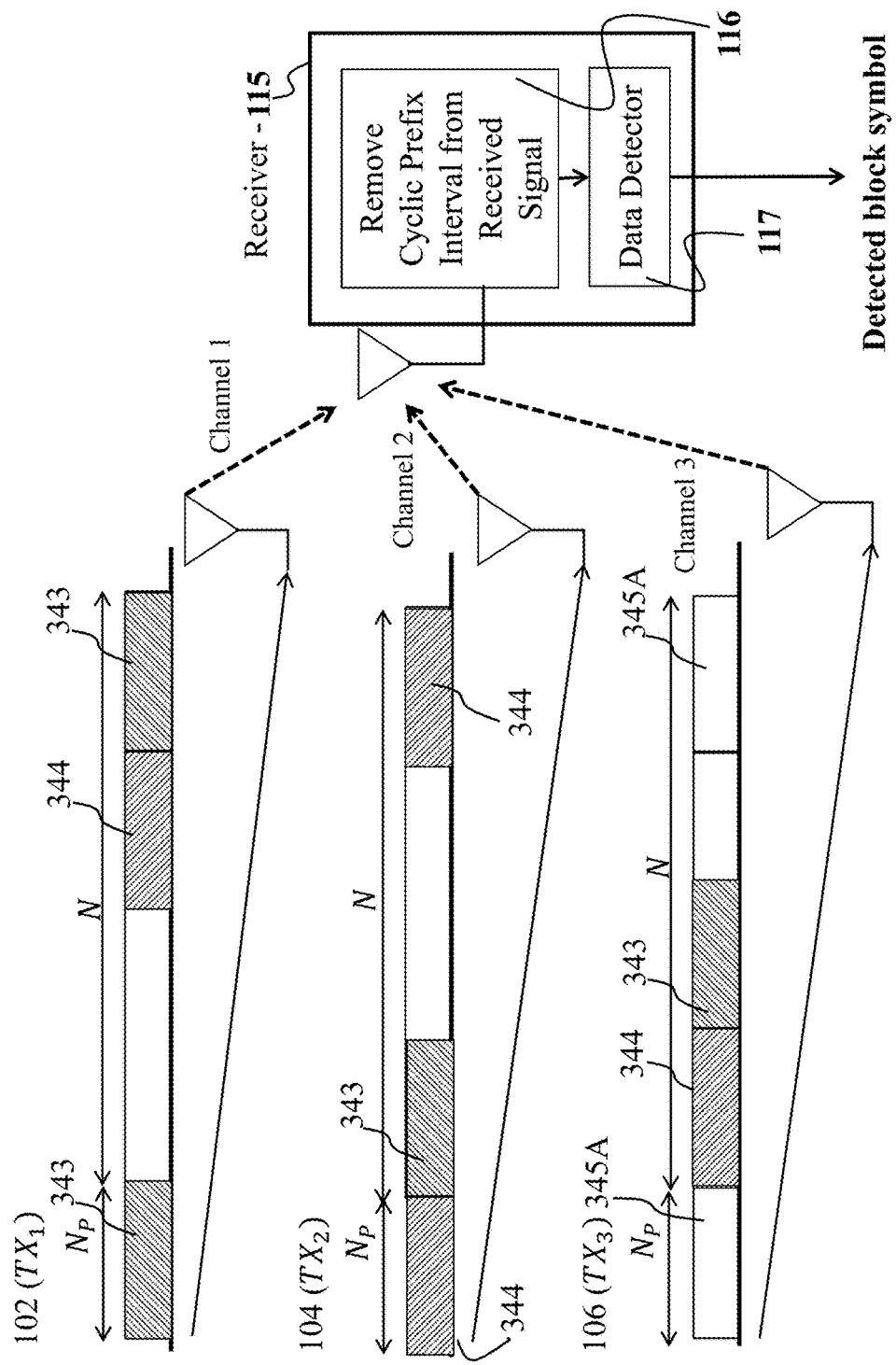
FIG. 6 shows is a schematic of overall transmission scheme incorporating both CDD and CP transmission, according to embodiments of the present disclosure.

FIG. 6 shows is a schematic of, according to embodiments of the present disclosure. FIG. 6 illustrates an example with three transmitters. Each transmitter applied its own CDD delay and then applies cyclic prefix according the computed minimal CP length determined in step 128 of FIG. 1B. Depending on the transmitter index, a final transmission block has a different structure although they are shifted versions one another. Receiver 115, first removes the cyclic prefixed interval in block 116, from the received signal since each transmitter applies the cyclic prefix. And then in block 116, apply the data detector. Then, the detected block symbol can be obtained as output.

Figure 7:
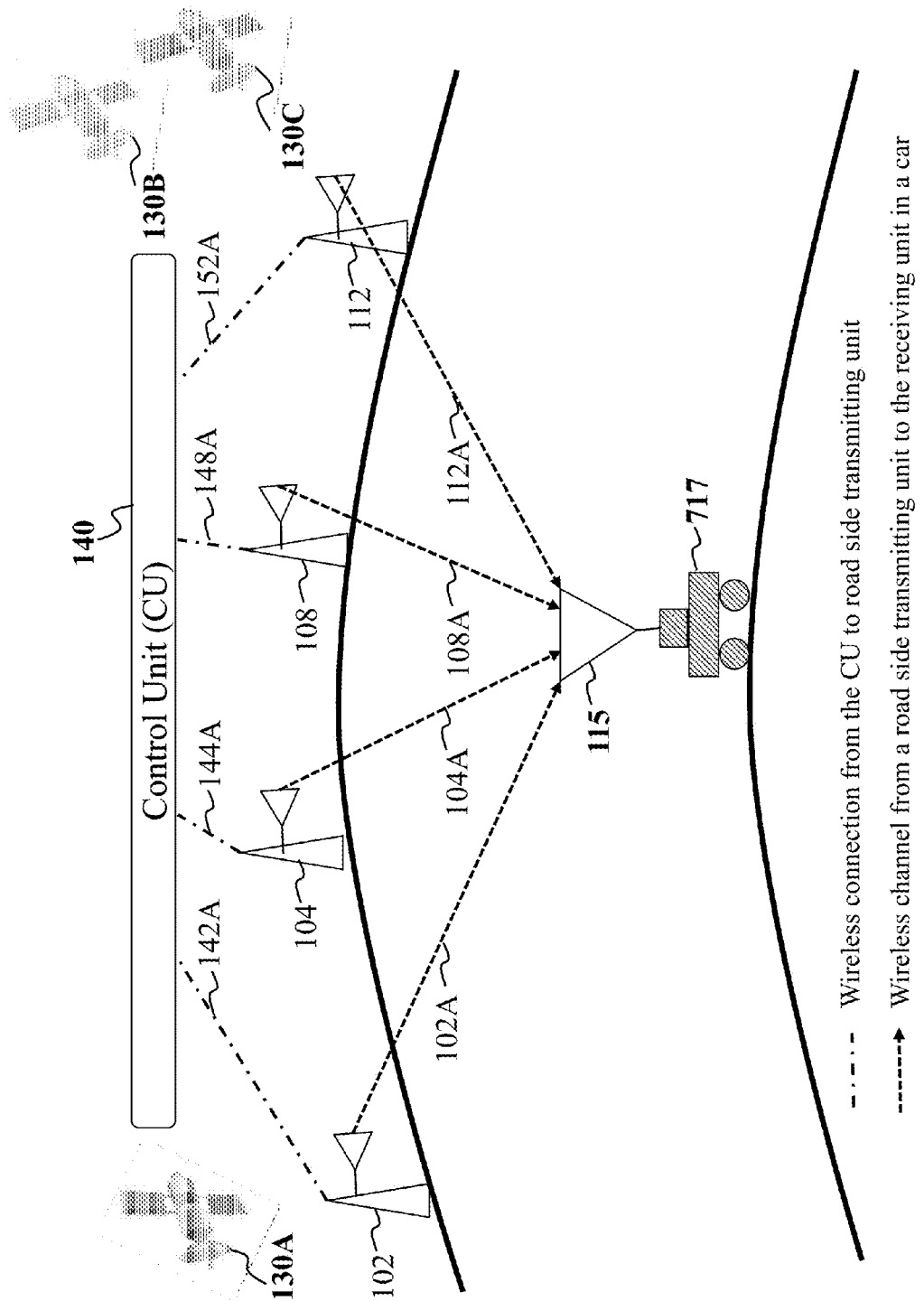
FIG. 7 shows is a schematic of a vehicle-to-X (V2X) communication network, according to some embodiments of the present disclosure.

FIG. 7 shows is a schematic of a vehicle-to-X (V2X) communication network, according to some embodiments of the present disclosure; FIG. 7 includes control unit 140 and multiple road-side transmitting units 102, 104, 108, 112. Between the control unit and road-side transmitting units are wirelessly connected via 142A, 144A, 148A, 152A. Between each road-side and the receiving unit 115 on the moving vehicle 717 are connected via wireless link 102A, 104A, 108A, 112A. Depending on the channel environment between road-side transmitting units and the moving vehicle, higher transmission reliability can be achieved by using a proposed idea.

Figure 8:
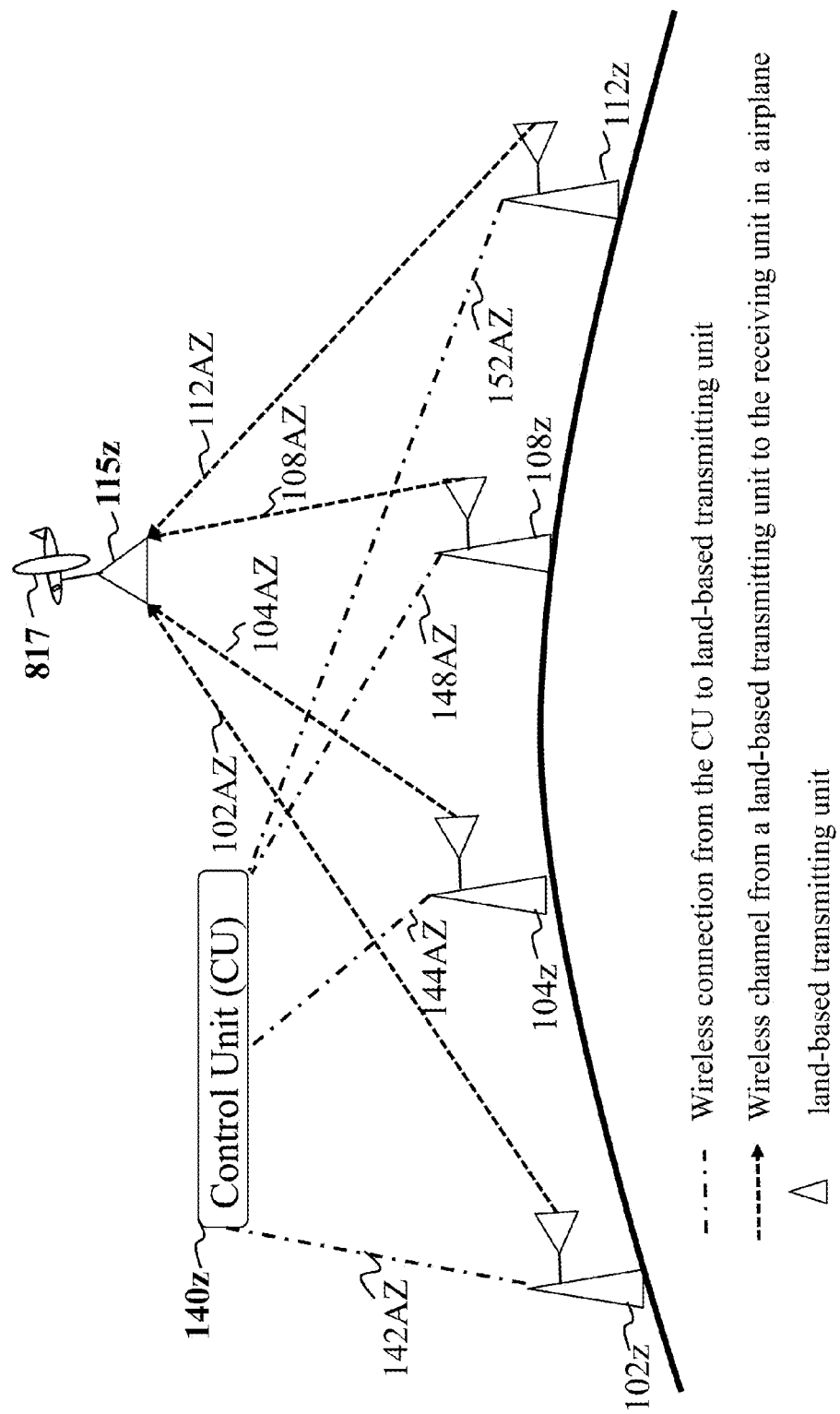
FIG. 8 shows is a schematic of an air-based wireless communication network, according to embodiments of the present disclosure.

FIG. 8 shows is a schematic of an air-based wireless communication network, according to some embodiments of the present disclosure. FIG. 8 includes control unit 140z and multiple land transmitting units 102z, 104z, 108z, 112z. Between the control unit 140z and land-based transmitting units are wirelessly connected via 142AZ, 144AZ, 148AZ, 152AZ. Between each land-based and the receiving unit 115z on the moving airplane 817 are connected via wireless link 102AZ, 104AZ, 108AZ, 112AZ. Depending on the channel environment between land-based transmitting units and the moving vehicle, higher transmission reliability can be achieved by using a proposed idea.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:
1. A communication system, comprising:
a cyclic delay diversity (CDD) scheme having a set of spatially distributed cooperating transmitters to transmit a message, wherein operations of the set of transmitters are synchronized with an accuracy bound by a synchronization error; and
a controller communicatively connected to each transmitter in the set of transmitters, wherein the controller is configured to:
determine a tap delay for a communication channel between a receiver and each transmitter in the set of transmitters to produce a set of tap delays;

determine a minimal length of a cyclic prefix as a function of a sum of the synchronization error and a maximal tap delay in the set of tap delays;
determine a length of the message;
determine a number of transmitters for transmission of the message, based on the determined length of the message and the minimal length of the cyclic prefix, so as to obtain a maximum number of transmitters for transmission;
select the maximum number of the transmitters from the set of transmitters to form a subset of transmitters based upon a magnitude of channel gains;
determine a delay of transmission for each transmitter in the subset of transmitters, based on the minimal length of the cyclic prefix; and
control, via an output device, at least some transmitters in the set of transmitters to transmit the message to the receiver using the CDD scheme with the cyclic prefix having at least the minimal length.

2. A communication system, comprising:
a set of transmitters, wherein operations of the set of transmitters are synchronized with an accuracy bound by a synchronization error; and
a controller communicatively connected to each transmitter in the set of transmitters, wherein the controller is configured to:
determine a tap delay for a communication channel between a receiver and each transmitter in the set of transmitters to produce a set of tap delays;
determine a minimal length of a cyclic prefix as a function of a sum of the synchronization error and a maximal tap delay in the set of tap delays;
determine a length of the message;
determine a number of transmitters for transmission of the message, based on the determined length of the message and the minimal length of the cyclic prefix, so as to obtain a maximum number of transmitters for transmission;
select the maximum number of the transmitters from the set of transmitters to form a subset of transmitters based upon a magnitude of channel gains;
determine a delay of transmission for each transmitter in the subset of transmitters, based on the minimal length of the cyclic prefix; and
control at least some transmitters in the set of transmitters to transmit a message to the receiver using a cyclic delay diversity (CDD) scheme with the cyclic prefix having at least the minimal length.

3. The communication system of claim 2, wherein the transmitters synchronize the operations using signals from a global navigation satellite system (GNSS), such that the synchronization error is at least in part due to differences in propagation of the signals from the GNSS to different transmitters in the set of transmitters.

4. The communication system of claim 2, wherein the controller is configured to:
determine a delay of transmission for each transmitter in the set of transmitters, based on the minimal length of the cyclic prefix.

5. The communication system of claim 2, wherein the message includes a packet-based Orthogonal Frequency Division Multiplexed (OFDM) transmission from at least two transmitters in the set of transmitters.

6. The communication system of claim 2, wherein at least two transmitters in the set of transmitters include a multimedia transmitting device and the transmitted message includes a packet-based orthogonal frequency division multiplexed (OFDM) transmission including multimedia content.

7. The communication system of claim 2, wherein the set of transmitters are in communication from one of a vehicle-to-X (V2X) communication network, a wireless communication network or a vehicle-infrastructure cooperative automated driving system.

8. A method using a cyclic delay diversity (CDD) scheme that includes a set of spatially distributed cooperating transmitters for transmitting a message that is a non-data-aided signal from transmitters in the set of transmitters to a receiver, wherein operations of the transmitters are synchronized with a synchronization error, comprising:
using a processor for performing the steps of:
determining a length of the message;
determining a number of transmitters from the set of transmitters for transmission of the message, based on the determined length of the message and the minimal length of the cyclic prefix, so as to obtain a maximum number of transmitters for transmission;
selecting the maximum number of the transmitters from the set of transmitters to form a subset of transmitters, to ensure the maximum reliability at the receiver for transmitting the message;
determine a delay of transmission for each transmitter in the subset of transmitters, based on the minimal length of the cyclic prefix;
determining a tap delay for each communication channel between the receiver and each transmitter in the set of transmitters to produce a set of tap delays;
determining a minimal length of a cyclic prefix as a function of a sum of the synchronization error and a maximal tap delay in the set of tap delays; and
transmitting the message from at least some transmitters using the CDD with the cyclic prefix having at least the minimal length.

9. The method of claim 8, wherein the set of transmitters synchronize the operations by operating on a universal clock using signals from a global navigation satellite system (GNSS) at the controller.

10. The method of claim 8, wherein operations of the set of transmitters include synchronizing each transmitter in the set of transmitters by operating on a universal clock using signals from a global navigation satellite system (GNSS).

11. The method of claim 8, further comprising:
determining a delay of transmission for each transmitter in the set of transmitters, based on the minimal length of the cyclic prefix.

12. The method of claim 8, wherein the message includes a packet-based Orthogonal Frequency Division Multiplexed (OFDM) transmission from at least two transmitters in the set of transmitters.

13. A non-transitory computer readable storage medium embodied thereon a program executable by a processor for performing a method, the method is for transmitting a message comprising:
acquiring a synchronization error bounding an accuracy of a synchronization of operations of a set of transmitters;
determining a tap delay for a communication channel between a receiver and each transmitter in the set of transmitters to produce a set of tap delays;
determining a minimal length of a cyclic prefix as a function of a sum of the synchronization error and a maximal tap delay in the set of tap delays;

determine a length of the message, along with a number of transmitters for transmission of the message, and based on the determined length of the message and the minimal length of the cyclic prefix, obtain a maximum number of transmitters for transmission;

selecting the maximum number of the transmitters from the set of transmitters to form a subset of transmitters, to ensure the maximum reliability at the receiver for transmitting the message;

determining a delay of transmission for each transmitter in the subset of transmitters, based on the minimal length of the cyclic prefix; and transmitting the message using a cyclic delay diversity (CDD) scheme with the cyclic prefix having at least the minimal length.

14. The method of claim 13, further comprising:

synchronizing the operations by operating on a universal clock using signals from a global navigation satellite system (GNSS).

15. The method of claim 13, further comprising:

determining a delay of transmission for each transmitter in the set of transmitters, based on the minimal length of the cyclic prefix.

16. The method of claim 13, wherein the message includes a packet-based Orthogonal Frequency Division Multiplexed (OFDM) transmission from at least two transmitters in the set of transmitters.

17. The method of claim 13, wherein the synchronization error is at least in part due to differences in propagation of the signals from the GNSS to different transmitters in the set of transmitters.

18. The communication system of claim 2, wherein the set of transmitters synchronize the operations by operating on a universal clock at the controller using signals from a global navigation satellite system (GNSS).

* * * * *